United States Patent
Fenster et al.

(10) Patent No.: US 11,393,473 B1
(45) Date of Patent: Jul. 19, 2022

(54) DEVICE ARBITRATION USING AUDIO CHARACTERISTICS

(71) Applicant: Amazon Technologies, Inc., Seattle, WA (US)

(72) Inventors: Alexandra Fenster, Mountain View, CA (US); Ragini Rajendra Prasad, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 226 days.

(21) Appl. No.: 16/876,775

(22) Filed: May 18, 2020

(51) Int. Cl.
| | |
|---|---|
| *G10L 15/05* | (2013.01) |
| *G10L 15/22* | (2006.01) |
| *G10L 15/08* | (2006.01) |
| *G10L 25/18* | (2013.01) |

(52) U.S. Cl.
CPC .............. *G10L 15/22* (2013.01); *G10L 15/08* (2013.01); *G10L 25/18* (2013.01); *G10L 2015/088* (2013.01); *G10L 2015/223* (2013.01)

(58) Field of Classification Search
CPC .......... G10L 15/00–15/34; G10L 25/18; G10L 25/21
See application file for complete search history.

(56) References Cited

U.S. PATENT DOCUMENTS

| | | | |
|---|---|---|---|
| 5,559,758 A * | 9/1996 | Wilson ..................... | H01Q 3/26 367/136 |
| 10,482,904 B1 * | 11/2019 | Hardie ..................... | G10L 15/22 |
| 2017/0076720 A1 * | 3/2017 | Gopalan ................. | G06F 3/167 |
| 2021/0350810 A1 * | 11/2021 | Phipps ..................... | G10L 17/18 |

* cited by examiner

*Primary Examiner* — Abul K Azad
(74) *Attorney, Agent, or Firm* — Pierce Atwood LLP

(57) ABSTRACT

Described herein is a system for device arbitration using characteristics of audio data captured by multiple devices. The system determines a feature vector corresponding to each device that captured an audio input, where the feature vector includes the audio energy levels, spectral data corresponding to the audio data and centroid data corresponding to the audio data. The feature vectors are processed using a trained component to select a device for further processing.

19 Claims, 13 Drawing Sheets

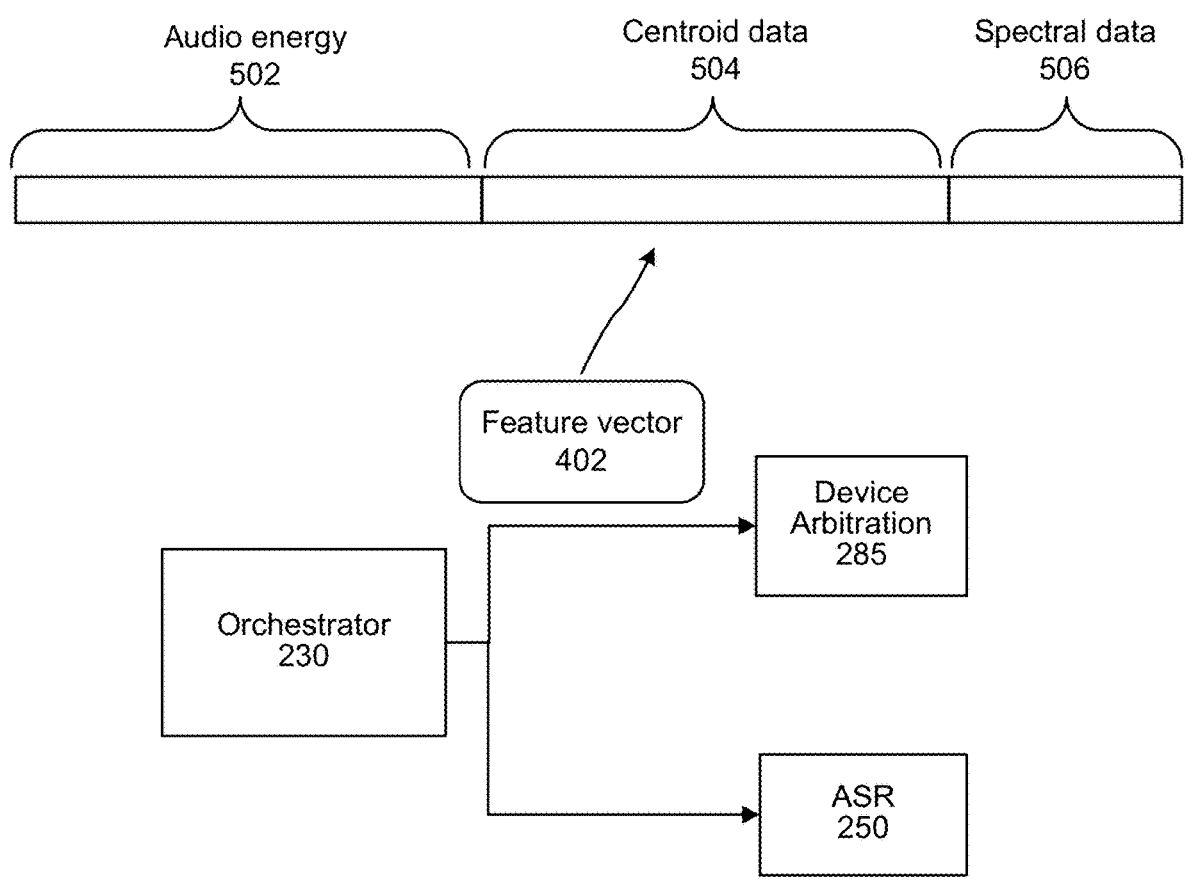

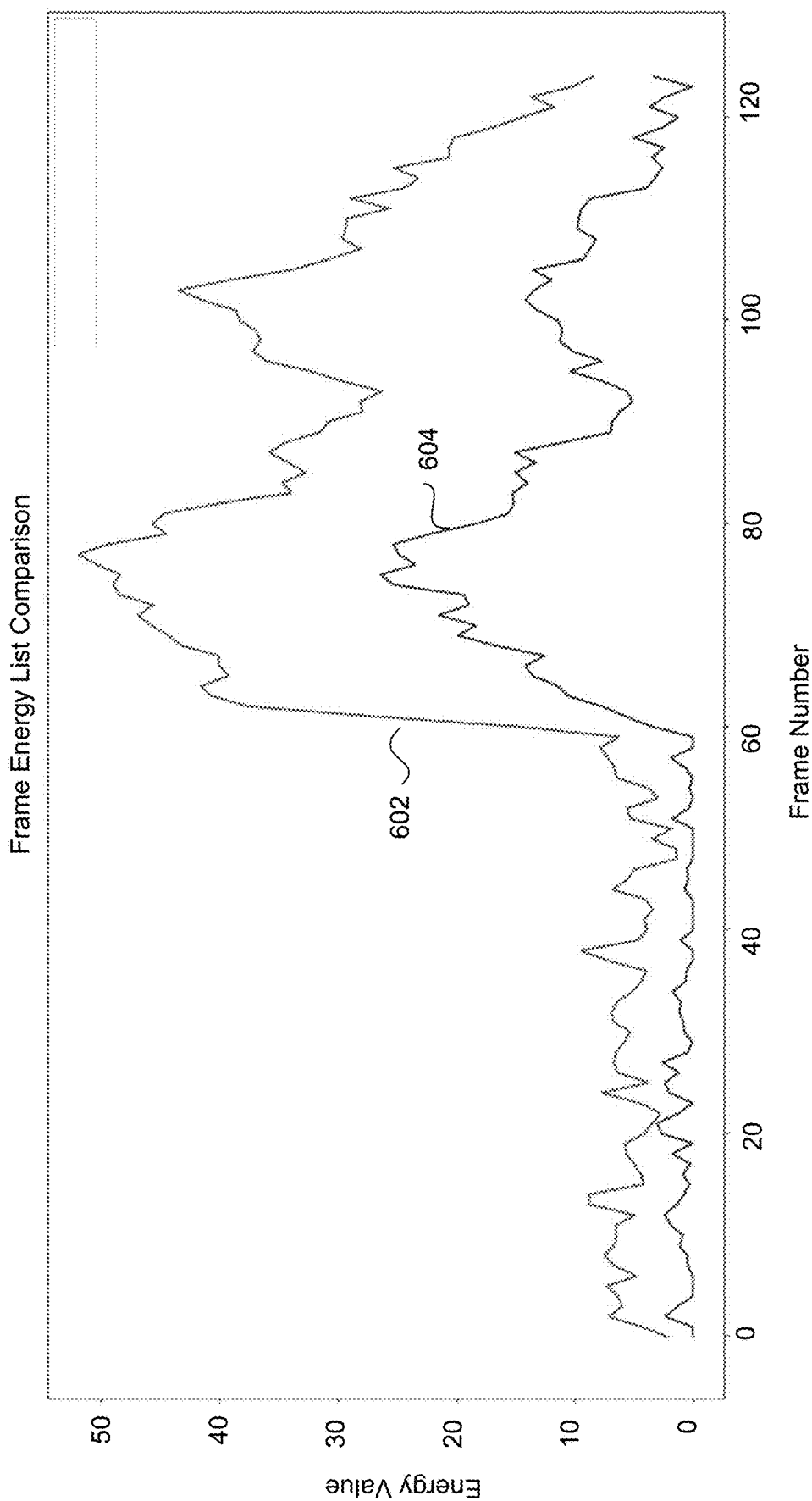

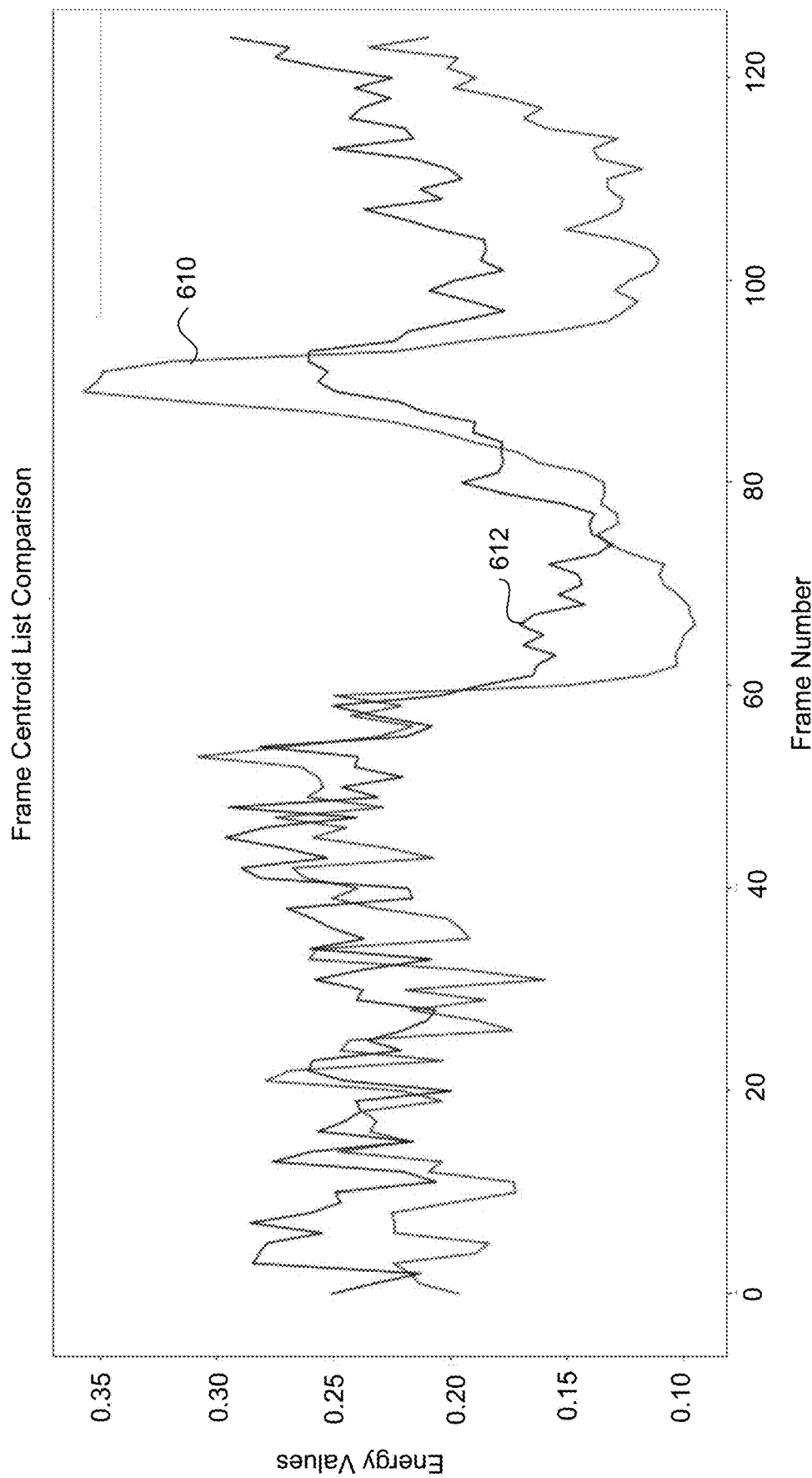

DEVICE ARBITRATION USING AUDIO CHARACTERISTICS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and/or natural language understanding processing techniques, or other techniques or combination thereof used to interpret input audio data is referred to herein as speech processing. Speech processing may also involve converting a user's speech into text data that may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 5 is a conceptual diagram illustrating portions of a feature vector used for device arbitration according to embodiments of the present disclosure.

FIGS. 6A, 6B and 6C are graphs illustrating example frame level energy values, spectral data and centroid data.

DETAILED DESCRIPTION

Figure 1:
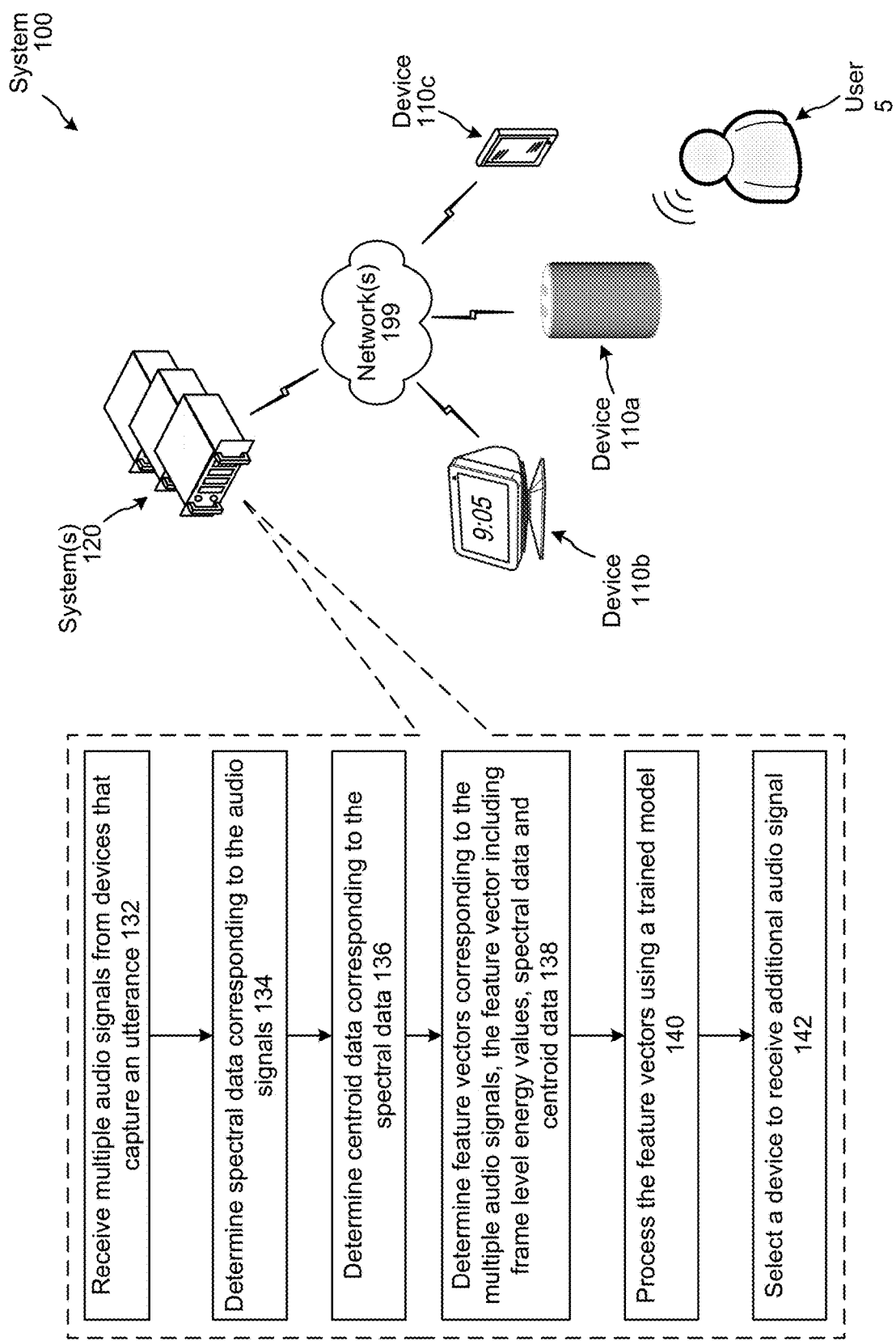
FIG. 1 illustrates a system configured to use various audio characteristics for device arbitration according to embodiments of the present disclosure.

Electronic devices may be used to capture audio data and generate audio output or other types of output. For example, an electronic device may generate audio using loudspeakers and may capture audio data using one or more microphones. A user may have multiple electronic devices within his/her household, office, yard, deck, or other physical space, sometimes referred to herein as an "environment" associated with the electronic devices. If such devices are located in acoustic proximity to each other (e.g., capable of capturing the same audio, within "earshot" of each other), a remote system may receive similar audio data from each of the electronic devices representing the same spoken utterance. The remote system may perform arbitration decisions to select an audio input from a single device with which to perform further processing, and from which to receive further audio input. The other (non-selected) electronic devices may be instructed to stop sending audio data to the remote system for the particular interaction, even though the non-selected devices are still receiving a user input in the form of audio data representing the voice of the user speaking to the system. Additionally, the remote system may use the selected device to present an output to the user.

The present disclosure relates to device arbitration by processing audio signals received from multiple devices within a household or other type of physical space. In addition to raw audio signals, the present disclosure describes processing of spectral energy levels derived from the audio signals and spectral centroid information derived from the audio signals. These audio characteristics are processed using a component, such as a trained model, to determine which device the user is closest to and selecting that device to capture further audio input.

Using these audio characteristics, the system of the present disclosure can also determine towards which device the user speech is directed. For example, there may be a device located behind the user and another device located in front of the user, and both devices may capture the user's speech. Operation of components and techniques according to the present disclosure allows the system to select the device in front of the user to capture additional audio input because processing the described audio characteristics indicates that the user is directing speech towards that device. In some embodiments, the spectral centroid information corresponding to the audio signal received from the selected device has a higher peak value compared to the spectral centroid information corresponding to the audio signals received from the other (non-selected) devices.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a spoken language processing system. Text-to-speech (TTS) is a field of concerning transforming textual data into audio data that is synthesized to resemble human speech.

Certain systems may be configured to perform actions responsive to user voice inputs. For example, for the user input of "Alexa, play music," a system may output music. For further example, for the user voice input of "Alexa, what is the weather," a system may output synthesized speech representing weather information for a geographic location of the user. In a further example, for the user voice input of "Alexa, send a message to John," a system may capture spoken message content and cause same to be output via a device registered to "John."

In some embodiments, the system described herein processes utterances spoken by a user and captured by multiple devices within the user's household, and perform device arbitration to select a device to capture additional input for further processing, such as ASR and NLU processing.

The systems and methods described herein can be used for device arbitration with respect to devices located within a physical space such that two or more of the devices capture audio generated by a source. Such physical spaces may include, but are not limited to, a household (with multiple floors), an office space, an outdoor space (e.g., backyard, parking lot, playground, etc.), a vehicle, a retail establishment (e.g., mall, store, etc.), a hotel, a lobby, and the like.

FIG. 1 illustrates a system configured to use acoustic characteristics for device arbitration according to embodiments of the present disclosure. As illustrated in FIG. 1, the system may include multiple devices (110a/110b/110c/110d) local to a user 5, and one or more systems 120 connected across one or more networks 199.

A user 5 may have multiple devices 110 set up in his/her home or other locations. When the user 5 speaks, more than one of the devices 110 may receive the audio signal depending on the location of the devices and the location of the user. The acoustic characteristics of the location/arrangement of devices influence the received audio signal energy at each device. The system 100 is configured to determine the device closest to the user using certain characteristics of the received audio signals and using a trained model to analyze those characteristics.

In some embodiments, the system 100 uses audio data, spectral data derived from the audio signal and centroid data derived from the spectral data for device arbitration. The audio data often comprises the raw audio signal/energy in the time domain. The spectral data is determined by performing a Fast Fourier Transformation (FFT) on the audio signal. As such, the spectral data comprises a frequency spectrum corresponding to the audio signal (a representation of the audio signal in the frequency domain). The centroid data corresponds to a characteristic of the frequency spectrum of the audio signal, and may be derived from the spectral data or the audio data. The centroid data, as understood by those in the art, may correspond to the center of mass or center of gravity of the frequency spectrum, and may relate to the brightness of a sound. The centroid data may correspond to the median of the frequency spectrum.

Audio originating close to a particular device (e.g., 110a) may be received by the device 110a and other devices (e.g., device 110b, device 110c, and device 110d (not shown)) within "earshot" of the device 110a. The system 100 may use certain audio characteristics to process the received audio signals with respect to each other (e.g., by comparing the audio characteristics of the received audio signals) to select the device to receive further audio input (for example, a system created audio acknowledgement of, or response to, a spoken utterance). The system 100 may perform device arbitration with respect to devices 110 that are linked, for example, associated with the same user profile.

Performing device arbitration as described herein can result in the system selecting the device that the user is closest to and/or the device the user is directing the utterance to. For example, the user may be close to a first device but may have his/her back facing the first device and his/her head facing a second device when speaking an utterance. The second device that is in front of the user may perceive a higher energy signal and the corresponding centroid data may indicate a higher peak/value as compared to that of the first device. The audio characteristics processed by the system(s) 120 for device arbitration may indicate that the selected device captured more energy corresponding to the audio input compared to that that the other devices captured.

Referring to FIG. 1, the system(s) 120 receives (132) multiple audio signals from devices 110 that capture an utterance spoken by the user 5. For example, the system(s) 120 may receive a first audio signal corresponding to the utterance as captured by the first device 110a, a second audio signal corresponding to the utterance as captured by the second device 110b, and a third audio signal corresponding to the utterance as captured by the third device 110c. The system(s) 120 may determine that the audio signals correspond to the same utterance based on the audio signals being associated with the same user profile and/or the audio signals being received within a certain time period.

The system(s) 120 determines (134) spectral data corresponding to each of the audio signals. For example, the system(s) 120 may determine first spectral data corresponding to the first audio signal, second spectral data corresponding to the second audio signal, and third spectral data corresponding to the third audio signal. The system(s) 120 may determine the spectral data by performing an FFT on the audio signal, and the spectral data may represent the audio signal in the frequency domain. In an example, the system 100 may perform an FFT on approximately 10-millisecond intervals of the audio signal corresponding to the duration of the wakeword included in the utterance. In an example embodiment, such processing results in 256 spectral components, which may be grouped into 32 spectral bands (each band being a summation of 8 spectral components).

The system(s) 120 determines (136) centroid data corresponding to each of the audio signals. For example, the system(s) 120 may determine first centroid data corresponding to the first audio signal, second centroid data corresponding to the second audio signal, and third centroid data corresponding to the third audio signal. The centroid data may represent characteristics (e.g., center of mass, median, etc.) of the frequency spectrum corresponding to the audio signal. In some embodiments, the centroid data is determined by processing the audio signal.

The system(s) 120 determines (138) feature vectors corresponding to each of the audio signals, where the feature vector includes frame energy values corresponding to the audio signal, the spectral data and the centroid data. For example, the system(s) 120 may determine a first feature vector corresponding to the first audio signal/first device 110a including the first audio data, the first spectral data and the first centroid data, a second feature vector corresponding to the second audio signal/second device 110b including the second audio data, the second spectral data and the second centroid data, and a third feature vector corresponding to the third audio signal/third device 110c including the third audio data, the third spectral data and the third centroid data. Additional details of the feature vector are described in relation to FIG. 5.

The system(s) 120 processes (140) the feature vectors using a trained component, which may include a trained model. Details of the trained component are described in relation to FIG. 4. In some embodiments, the trained component may be configured to process certain audio characteristics, such as audio data, spectral data and centroid data, corresponding to multiple audio signals to perform device arbitration.

The system(s) 120 selects (142) a device 110 to receive additional audio signal. The output of the trained component may be used by the system(s) 120 to select the device 110. For example, the output of the trained component may indicate that the first device 110a wins the device arbitration. In some embodiments, the output of the trained component may be a score, a probability value, or other output corresponding to each device 110 that captured the audio signal. The system(s) 120 may select the first device 110a based on its score/probability being higher than the score/probability corresponding to the other devices 110b and 110c. In some embodiments, the trained component may be configured to determine which of the device 110 is closest to the user 5 based on the audio characteristics of the audio signals captured by the devices 110. In some embodiments, the trained component may be configured to determine which of the device 110 captured a better/stronger audio signal based on the qualities/characteristics of the energy values represented in the captured audio data, the characteristics including the values in the feature vector (e.g., energy values, spectral data, centroid data, etc.). For example, in one case, the device 110a that has a higher signal strength (represented in the energy values, spectral data and the centroid data) as compared to another device 110b may win the device arbitration.

The system(s) 120 may send an indication to the first device 110a that it is selected based on the arbitration performed by the system(s) 120. The first device 110a may continue capturing further audio signals, if any, from the user 5 during the interaction and/or for a particular time period. The system(s) 120 may only process further audio signals, if any, received from the first device 110a for the interaction with the user 5 and/or for a particular time period. The system(s) 120 may also send output data to the first device 110a for presentation to the user 5.

The system(s) 120 may send an indication to the other devices—at least the second device 110b and the third device 110c that it was not selected, and the devices 110b and 110c may stop sending further audio signals to the system(s) 120 for at least this interaction with the user 5 and/or for a particular time period. In some cases, if the devices 110b and 110c captures audio data corresponding to the user speaking the wakeword again, then the devices 110b and 110c may start sending audio signals to the system(s) 120 as the user may have started another interaction with the system(s) 120.

The system(s) 120 may analyze the portion of the audio signals corresponding to a wakeword included in the utterance, which may be approximately 200-700 milliseconds of audio. The system(s) 120 is able to perform the functionalities described herein using a small amount of audio data, such as that representing a wakeword spoken by a user, or even a portion of the wakeword. Therefore, the audio data, the spectral data and the centroid data used by the system 100 corresponds to a portion of an utterance that comprises the wakeword.

Figure 2:
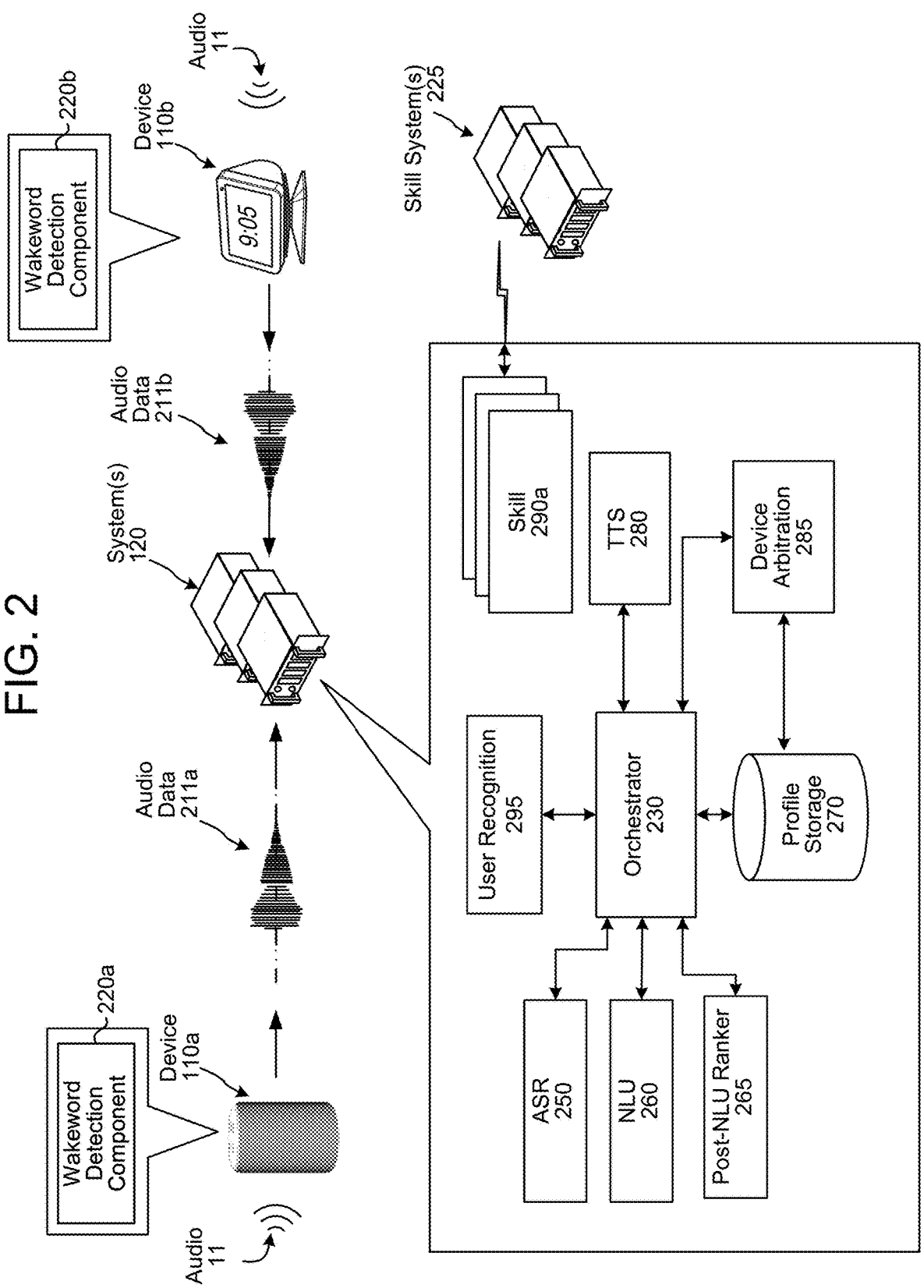
FIG. 2 is a conceptual diagram of components of a system according to embodiments of the present disclosure.

The overall system of the present disclosure may operate using various components as illustrated in FIG. 2. The various components may be located on same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the devices 110a/110b may use a wakeword detection component 220a/220b to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

In another example the device 110 may be configured to process commands associated with a first wakeword using a different set of components than commands associated with a second wakeword. For example, if an utterance includes the wakeword "Alexa," audio data for that wakeword may be sent to a first speech processing system for speech processing and/or command execution. If an utterance includes the wakeword "Ok Google," audio data for that wakeword may be sent to a second speech processing system for speech processing and/or command execution. In another example the system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

Once the wakeword is detected, the device 110a may "wake" and begin transmitting audio data 211a, representing the audio 11, to the system(s) 120, and the device 110b may "wake" and begin transmitting audio data 211b, representing the audio 11, to the system(s) 120. The audio data 211 may include data corresponding to the wakeword, or the device 110a may remove the portion of the audio corresponding to the wakeword prior to sending the audio data 211 to the system(s) 120.

An orchestrator component 230 may receive the audio data 211. The orchestrator component 230 may include memory and logic that enables the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5. The NLU component 260 may send NLU results data (which may include tagged text data, indicators of intent, etc.).

The system(s) 120 may include one or more skills 290. A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Skills may be associated with different domains, such as smart home, music, video, flash briefing, shopping, and custom (e.g., skills not associated with any pre-configured domain).

The system(s) 120 may be configured with a single skill 290 dedicated to interacting with more than one skill system 225.

Unless expressly stated otherwise, reference to a skill, skill device, skill component, or the like herein may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a post-NLU ranker 265 that receives NLU results data and determines (as described in detail herein) which skill the system(s) 120 should invoke to execute with respect to the user input. The post-NLU ranker 265 may be implemented separately from the orchestrator component 230 (as illustrated) or one or more components of the post-NLU ranker 265 may be implemented as part of the orchestrator component 230.

The system(s) 120 may include a TTS component 280. The TTS component 280 may generate audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the system(s) 120 with permission to allow the skill to execute with respect to the user's inputs. If a user does not enable a skill, the system(s) 120 may not permit the skill to execute with respect to the user's inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system(s) 120 may include a user recognition component 295. In at least some examples, the user recognition component 295 may be implemented as a skill system(s) 125.

The user recognition component 295 may recognize one or more users using various data. The user recognition component 295 may take as input the audio data 211 or other forms of input provided by the user 5. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, etc.), received by the system(s) 120 in correlation with a natural language input, to stored biometric data of users. The user recognition component 295 may additionally or alternatively perform user recognition by comparing image data (e.g., including a representation of at least a feature of a user), received by the system(s) 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition operations.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill system(s) 125, as well as processing performed by other components of the system(s) 120 and/or other systems.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The system(s) 120 may include a device arbitration component 285 that may be configured to perform device arbitration to select a device 110 for further processing by evaluating certain audio characteristics of audio signals captured by multiple devices 110. The device arbitration component 285 may perform device arbitration between devices 110 that are associated with the same user profile/user profile identifier. For example, the profile storage 270 may include device identifiers that are associated with the user profile, and the device arbitration component 285 or another component (e.g., orchestrator 230) may determine that the identifiers corresponding to the devices 110 sending the audio signals are associated with the same user profile.

In some cases, multiple devices may be within "earshot" of a sound/audio source, and may capture an audio signal from the source. For example, a user may speak an utterance, and multiple devices 110 may be located near the user such that more than one device 110 captures audio data 211 corresponding to the utterance. The first audio data 211a captured by the device 110a may be different than the second audio data 211b captured by the device 110b due to various factors, such as, location of the device 110 with respect to the user/source, device characteristics (e.g., microphone gain, etc.), location of other objects with respect to the user/source and the device 110, which direction the user/source is facing, location of the user/source, characteristics of the user/source environment/household/physical space, and the like.

Figure 3:
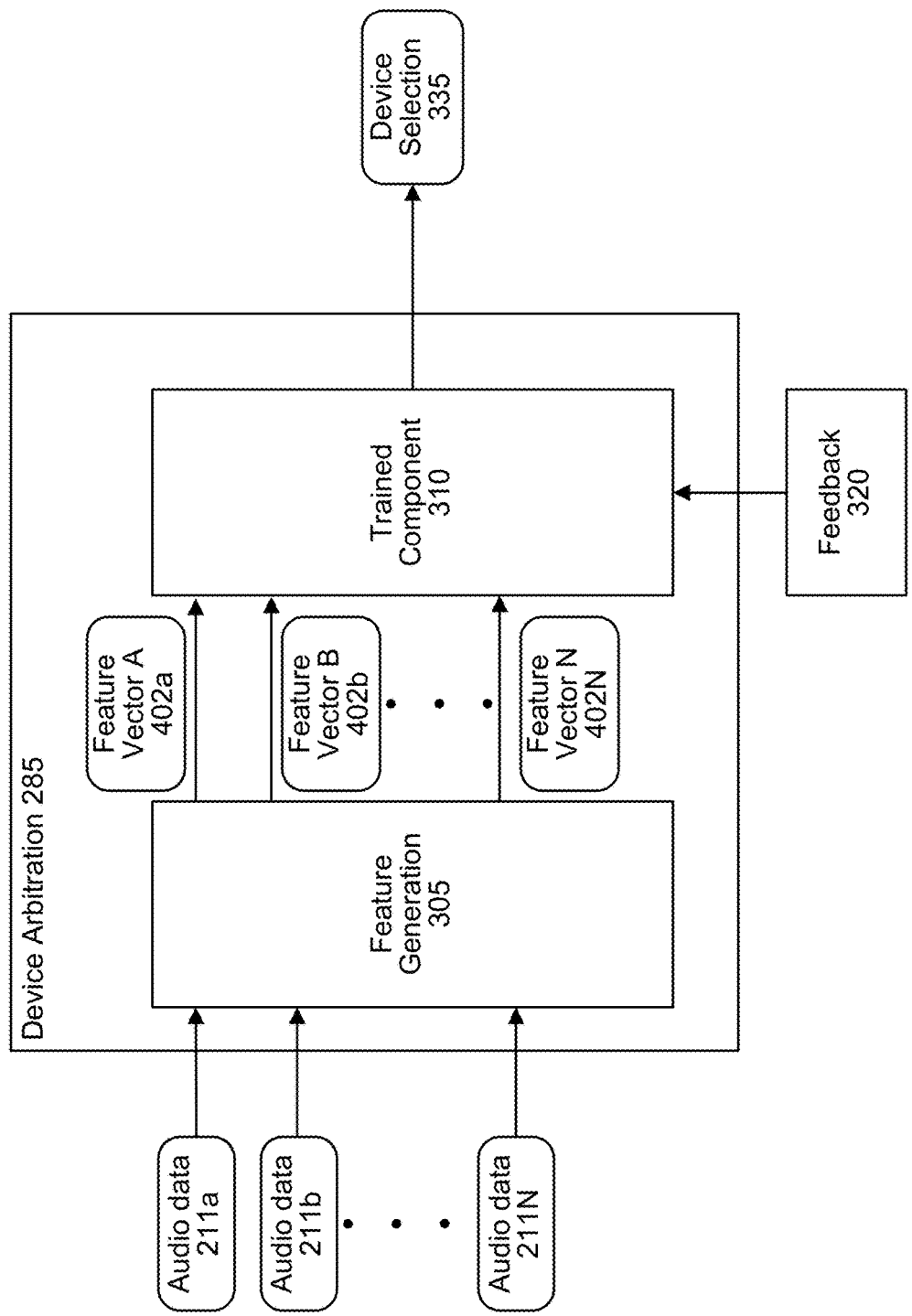
FIG. 3 is a conceptual diagram illustrating components of a device arbitration component according to embodiments of the present disclosure.

FIG. 3 is a conceptual diagram illustrating components of a device arbitration component 285 that the system 100 may use to perform arbitration according to embodiments of the present disclosure. The device arbitration component 285 may include a feature generation component 305 and a trained component 310. In some embodiments, the feature generation component 305 may process audio data 211 from multiple devices 110 to determine feature vectors 402 corresponding to the audio data 211. In other embodiments, as illustrated in FIG. 5 the orchestrator 230 may provide the feature vectors 402 corresponding to the audio data 211 received from multiple devices 110. The feature generation component 305 may thus comprise an encoder that can encode audio data 211 into a form that can be processed by the trained component 310. The feature generation component 305 and trained component 310 may be jointly trained.

The feature generation component 305 may process audio data 211 received from multiple devices that capture an audio signal. For example, the feature generation component 305 may process audio data 211a received from the device 110a, audio data 211b received from the device 110b, and other audio data received from other devices 110 (e.g. audio data 211N received from the device 110N). The feature generation component 305 may thus process the audio data 211 to generate feature vectors 402. The feature generation component 305 may generate a first feature vector 402a representing certain features/characteristics of the first audio data 211a, a second feature vector 402b representing certain features/characteristics of the second audio data 211b, and other feature vectors 402 representing certain features/characteristics of other audio data 211 (e.g., feature vector 402N corresponding to the audio data 211N).

The feature generation component 305 may include a representation of a portion of the audio data 211 in a feature vector 402. In some embodiments, the feature vector 402 may include energy values as a time series corresponding to the audio data 211 captured by the device 110. The energy values may correspond to 10 millisecond intervals of the audio data 211 corresponding to the duration of the wakeword. In some embodiments, the feature generation component 305 may process a file including raw audio captured by multiple devices, the audio may be beamformed audio, containing discrete signals combined from all device microphones that captured the user input. In some embodiments, the frame-level energy values included in the feature vector 402 may be determined using approximately 1.265 seconds of audio from the beginning of the captured audio. In some embodiments, the feature vector 402 may include 125 values representing the energy values, where the 125 values are determined by processing approximately 1.265 seconds of audio with a 25 ms window with a 10 ms shift/sliding window resulting in 125 windows. For each window, 1 aggregated energy value is calculated to include in the feature vector 402. In some embodiments, the feature vector 402 includes a frame energy list which may be determined using the root-squared-means-error (RSME) of the discrete audio signal.

The feature generation component 305 may determine spectral data corresponding to the audio data 211 and include the spectral data in the feature vector 402, as illustrated in FIG. 5 (506). The feature generation component 305 may determine the spectral data by performing an FFT on the audio data 211, and the spectral data may represent the audio data in the frequency domain. In an example, the feature generation component 305 may perform FFT(s) on approximately 10-millisecond intervals of the audio data 211 corresponding to the duration of the wakeword. In an example embodiment, such processing results in 256 spectral components, which may be grouped into 32 spectral bands (each band being a summation of 8 spectral components). As such the feature vector 402 may include 32 values corresponding to the spectral data. In other embodiments, the feature vector 402 may include fewer or more values corresponding to the spectral data. In some embodiments, the spectral data representing the spectral energy list may be determined by splitting the original 256 frequencies of FFT values into 32 bands and summing the FFT values within this band across all 125 windows. As such, the spectral data may not include data relating to time-domain dimension, but instead includes data relating to the aggregated strength of the signal within frequency bands.

The feature generation component 305 may determine centroid data corresponding to the audio data 211 and include the centroid data in the feature vector 402, as illustrated in FIG. 5 (504). The feature generation component 305 may determine the centroid data by processing the audio captured by the devices 110 as described below.

In some embodiments, the feature generation component 305 determines the centroid data as the weighted mean of the frequencies present in the audio data, determined using a FFT transformation, with their magnitudes as the weights, using the equation below:

$$Centroid = \frac{\sum_{n=0}^{N-1} f(n)x(n)}{\sum_{n=0}^{N-1} x(n)}$$

where x(n) represents the weighted frequency value, or magnitude, of bin number n, and f(n) represents the center frequency of that bin.

In some embodiments, the feature generation component 305 determines FFT (e.g., 256 frequencies) using a window of 25 ms with a 10 ms sliding window for approximately 1.256 seconds of captured audio. For every window of 25 ms, the feature generation component 305 may process the spectrogram by converting 256 complex numbers to one float number by summing up squares of the real and imaginary parts and performing a log function on the float number. Then for each window, the feature generation component 305 calculates the spectral centroid data using frequency bands and signal strength for those frequency bands.

In an example embodiment, for a given frame, the centroid data may be calculated as follows:
    float numerator=0;
    float denominator=0;
    for (int i=0; i<spectrogram.Dim( ); i++)
    {
    numerator+=i*spectrogram(i);
    denominator+=spectrogram(i);
    }
    float centroid=numerator/(denominator*spectrogram.Dim( )+EPSILON).

In an example embodiment, the spectrogram(i) is the signal magnitude for a given i-th frequency, accumulated in both numerator and denominator. The centroid data is determined using frequency and a weight in the numerator to obtain a weighted mean of frequencies.

In some embodiments, the centroid data is the median of the spectrum corresponding to the audio data 211. The centroid data may represent a measure of central tendency within the frequency spectrum of the audio data.

In other embodiments, the feature generation component 305 may determine other features/characteristics corresponding to the audio data 211 to aid the device arbitration component 285 in performing device arbitration. These other features/characteristics may be included in the feature vector 402 either by the feature generation component 305, or in other embodiments by the orchestrator 230 or other component as described in relation to FIG. 5.

In other embodiments, the feature generation component 305 may determine one feature vector including features/characteristics corresponding to audio data 211 captured by multiple devices, rather than multiple separate feature vectors where each feature vector corresponds to audio data captured by one device.

Figure 4:
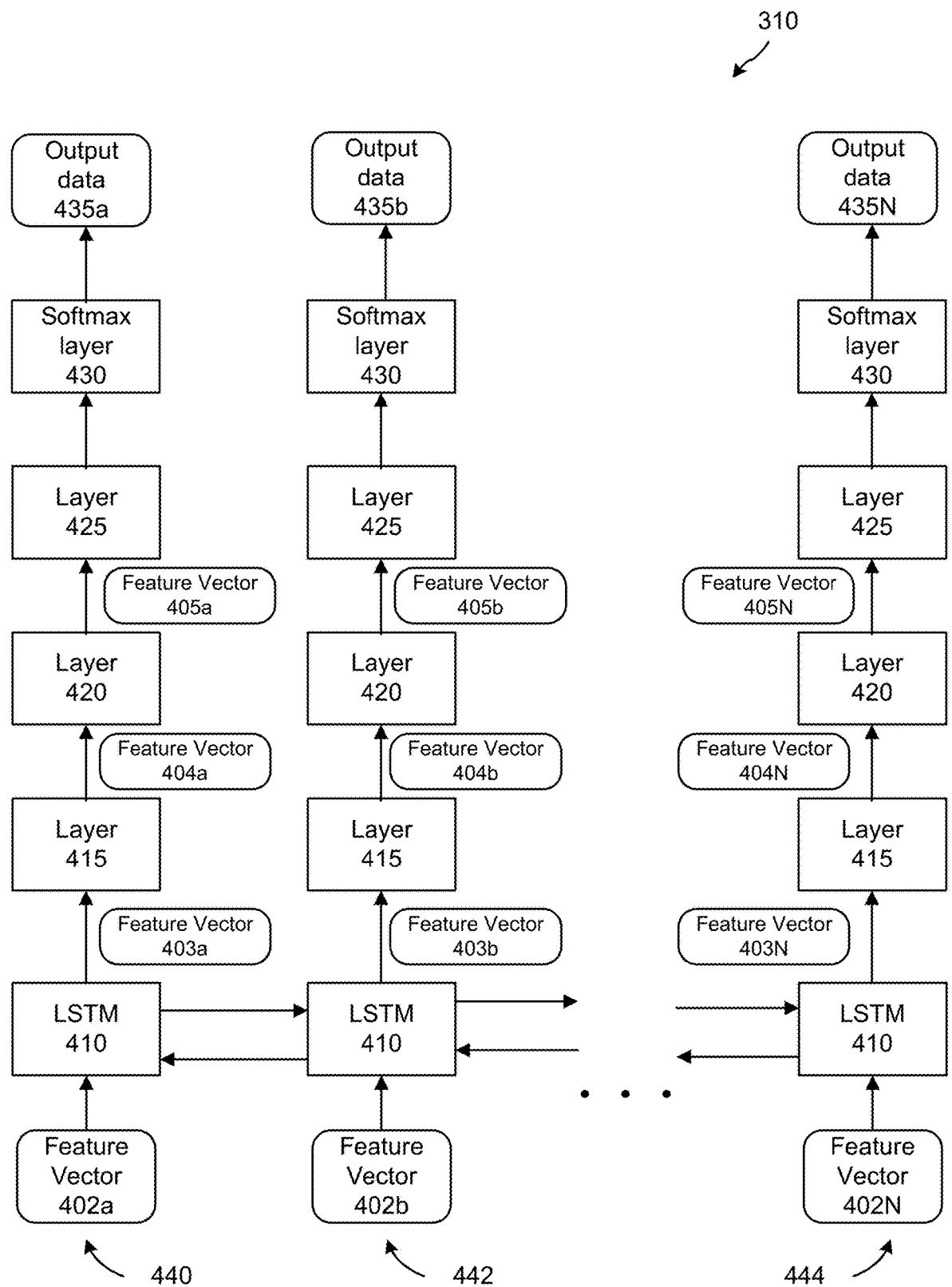
FIG. 4 is a conceptual diagram illustrating components of a trained component for device arbitration according to embodiments of the present disclosure.

The trained component 310 may include the components described in relation to FIG. 4. The trained component 310 may be configured to evaluate certain audio characteristics represented by the feature vectors 402 corresponding to the audio signals 211 captured by multiple devices 110, and to select a device 110 to capture additional audio input and/or to present an output to the user. The trained component 310 may generate output data (e.g., output data 435 of FIG. 4), which may include a score, probability, likelihood or other similar indications that a device 110 (from the devices 110 that captured the audio signal) should be selected for further processing. The score/probability may be based on the trained component 310 processing the audio features represented in the feature vector 402.

The output of the device arbitration component 285 may be the device selection data 335, which may include an indication of which device is selected to capture further audio input and/or present an output to the user. The device selection data 335 may include a device identifier associated with the selected device, a device name (determined by the system(s) 120 or provided by the user; e.g., "living room Echo" or "kitchen speaker") associated with the selected device, or other identifiers corresponding to the selected device. In some embodiments, the device selection data 335 may include information corresponding to the non-selected devices along with an indication that those devices were not selected. The device selection data 335 may be sent to the orchestrator 230 for further processing, such as, sending a message to the selected device 110 to continue capturing audio input, sending a message to the other non-selected devices 110 to stop sending audio input, sending output data responsive to a user request to the selected device 110, and the like.

The feedback component 320 may be part of the device arbitration component 285 in some embodiments. The feedback component 320 may process input(s) from the user indicating feedback with respect to the device selection 335. In some embodiments, the system(s) 120 may request the user to provide feedback on whether the system made the right device selection. For example, after presenting an output responsive to the user input, the system(s) 120 may cause the selected device 110 to output "Can you provide some feedback for your experience? Did I respond from the device that you expected?" or a similar natural language output eliciting feedback from the user. As described above, the system(s) 120 may use the TTS component 280 to generate synthesized speech to present the output eliciting feedback to the user. The user may respond to such an output by saying "yes" (or another similar affirmative response) or "no" (or another similar negative response), or by providing feedback in other input forms, such as via a touchscreen of the device 110, by performing a gesture (e.g., thumbs up, thumbs down, etc.) that is captured by a camera of the device 110, providing a facial expression (e.g., a smile, a frown, etc.) that may be captured by a camera of the device 110*a*/110*b*, selecting a button on the device 110, etc. In some embodiments, the feedback component 320 may process implicit feedback from the user. Implicit feedback may be determined by the system(s) 120 based on the user making certain sounds (e.g., sighing, giggles, etc.), the user abandoning the interaction with the device 110, the user indicating a particular sentiment or emotion during interaction, etc.

The feedback component 320 may process the explicit feedback provided by the user and/or the implicit feedback determined by the system(s) 120, and may provide feedback data to the trained component 310. The system(s) 120 may train or retrain the model(s), implemented by the trained component 310, using the provided feedback so the device arbitration component 285 may be better at selecting the device the user expects.

In this manner, the system(s) 120 may use the audio characteristics for device arbitration and selection for further processing. Further processing may include the system(s) 120 processing further audio input captured by the selected device using ASR and NLU. The system(s) 120 may continue receiving input audio signals from the selected device, and the other devices may stop sending audio signals to the system. The system(s) 120 may, in some embodiments, send output data to the selected device for presentation to the user, where the output data is responsive to the user input. For example, the utterance spoken by a user may be "Alexa, play music." The system(s) 120 may perform device arbitration as described above and may determine which device 110 the user is closest to and/or directing the utterance to. The system(s) 120 may then send output data corresponding to music to the selected device 110.

In a non-limiting example, the system(s) 120 may determine a specific output based on the selected device. For example, the utterance spoken by a user may be "Alexa, turn on the lights." The system(s) 120, as described above, may determine which device 110 the user is closest to and/or directing the utterance to. The system(s) 120 may then determine which lights are the closest to the selected device, or which room the selected device is in, and turn on the appropriate lights.

A trained component 310 for the device arbitration component 285 may take many forms, including a neural network. A neural network may include a number of layers, from an input layer through an output layer. Each layer may be configured to take as input a particular type of data and output another type of data. The output from one layer is taken as the input to the next layer. While values for the input data/output data of a particular layer are not known until a neural network is actually operating during runtime, the data describing the neural network describes the structure, parameters, and operations of the layers of the neural network.

One or more of the middle layers of the neural network may also be known as the hidden layer. Each node of the hidden layer is connected to each node in the input layer and each node in the output layer. In the case where the neural network comprises multiple middle networks, each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

In one aspect, the neural network may be constructed with recurrent connections such that the output of the hidden layer of the network feeds back into the hidden layer again for the next set of inputs. Each node of the input layer connects to each node of the hidden layer. Each node of the hidden layer connects to each node of the output layer. The output of the hidden layer is fed back into the hidden layer for processing of the next set of inputs. A neural network incorporating recurrent connections may be referred to as a recurrent neural network (RNN).

In some embodiments, the neural network may be a long short-term memory (LSTM) network. In some embodiments, the LSTM may be a bidirectional LSTM (e.g., LSTM 410 of FIG. 410). The bidirectional LSTM runs inputs from two temporal directions, one from past states to future states and one from future states to past states, where the past state may correspond to characteristics for the audio signal for a first time frame and the future state may corresponding to characteristics for the audio signal for a second subsequent time frame.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data.

FIG. 4 is a conceptual diagram of components of the trained component/model 310 used for device arbitration. As shown, example components of the trained component 310 may include a LSTM 410, multiple layers 415, 420 and 425 and a softmax layer 430. The feature vectors 402 may be provided as inputs to the trained component 310. The layers 415, 420 and 425 may be fully connected layers. Neurons in a fully connected layer have full connections to all activations in the previous layer.

The LSTM 410 may be a bidirectional LSTM. During a first iteration 440, the first feature vector 402*a* may be provided to the LSTM 410 for processing. The model parameters, weights and other data learned by the LSTM 410 during the first iteration may be stored for use during a second iteration. During a second iteration/time step 442, the LSTM 410 may be provided the second feature vector 402*b*, and the LSTM 410 may use the model parameters and weights learned during the first iteration to process the second feature vector 402*b*. The model parameters, weights and other data learned during the second iteration may be stored for use during subsequent iterations when processing other feature vectors 402 (e.g., 402N). The model parameters, weights and other data learned during the second iteration may be used to process the first feature vector 402*a*, which may be performed during the second iteration. Similarly, the model parameters and weights learned during subsequent iterations (e.g., 444) when processing other feature vectors (e.g., 402N) may be used to process previously processed feature vectors such as 402*b*. The number of iterations performed by the trained component 310 depends on the number of devices 110 that capture audio data corresponding to a user input.

In other embodiments, the feature vectors 402a, 402b and 402N may be processed by the LSTM 410 simultaneously, and model weights and parameters learned during each instance of processing a feature vector may be used to process other feature vectors during a second timestep/iteration.

The output of the LSTM 410 may be feature vector 403. The feature vector 403 may be the same size as the feature vector 402. The feature vector 403 may include weights/scores assigned to the values of the feature vector 402 based on processing performed by the LSTM 410. The feature vector 403 may be inputted to a first layer 415.

The layer 415 may transform the output of the LSTM 410 into the feature vector 404. The layer 415 may transform the feature vector 403 such that the feature vector 404 has 64 values.

The layer 420 may transform the output feature vector 404 of the layer 415 into the feature vector 405 such that the feature vector 405 has 32 values. The layer 425 may transform the output feature vector 405 of the activation layer 420. The output of the activation layer 425 may be a vector of N length, where N is the number of devices being analyzed by the device arbitration component 285 for device selection.

In some embodiments, the layers 415, 420 and/or 425 may implement a rectified linear unit (ReLu) activation function.

The softmax layer 430 may process the output vector of the activation layer 425 to determine output data 435. The softmax layer 430 may normalize the output vector into a probability distribution. The output data 435 may include a probability or score corresponding to each device 110 that is analyzed by the device arbitration component 285.

In some embodiments, the output data 435 may be processed by the trained component 310 or the device arbitration component 285 using a champion/winner schema to determine the device selection data 335. The trained component 310 may process N devices and perform all possible pairwise comparisons/evaluations using the respective feature vectors 402. For each comparison/evaluation, the winner is assigned a certain number of points (e.g., 3 points). The trained component 310 may process feature vectors 402 corresponding to two devices at a time, and choose a "winner" from the two devices to continue processing/comparing to a feature vector corresponding to another device. For example, the trained component 310 may process the first feature vector 402a corresponding to the device 110a and the second feature vector 402b corresponding to the device 110b, and may determine that the device 110a has a higher score/probability compared to the device 110b and that device 110a should be selected for further processing. In this step, the device 110a is assigned 3 points. Then the trained component may process a third feature vector 402c (not shown) corresponding to the device 110c, and determine that the device 110a has a higher score/probability compared to the device 110c and that device 110a should be selected for further processing. In this step, the device 110a is assigned another 3 points, total of 6 points. Then the trained component may process a fourth feature vector 402d (not shown) corresponding to the device 110d (not shown), and determine that the device 110d has a higher score/probability compared to the device 110a and that device 110d should be selected for further processing. In this step, the device 110d is assigned 3 points. Assuming four devices 110 captured the audio data, the final output of the trained component 310 or another component (not shown) of the device arbitration component 285 may be a score vector including scores for each of the evaluated devices 110. Continuing with the above example, the vector may be <device 110a: 6, device 110b: 0, device 110c: 0, device 110d: 3>. Using the score vector, the device arbitration component 285 may select the device 110a and may output the device selection data 335 indicating selection of the device 110a.

The trained component 310 may configured using training data. Example training data may include multiple sets of feature vectors, where each feature vector includes at least audio data, corresponding spectral data and corresponding centroid data. A set of feature vectors may correspond to multiple devices capturing audio data relating to one utterance/sound during one interaction/session with a user. One of the feature vectors in the set may be labeled as the selected device for device arbitration (that is the closest device, the device the audio input was directed to, and/or the device that the user expected to be selected). The remaining feature vectors may be labeled as the non-selected device. Using audio characteristics represented in the feature vectors corresponding to multiple different interactions the trained component 310 may learn model weights and parameters.

In some embodiments, the training data may include feature vectors with other audio characteristics depending on which audio characteristics the device arbitration component 285 is configured to process.

In some embodiments, feedback data received and processed by the feedback component 320 may be used as training data for the trained component 310. That is, the system(s) 120 may elicit explicit feedback or may receive implicit feedback from the user after a device selection is performed. The audio signals captured by multiple devices during that interaction may be included in the training data, and the feature vector corresponding to the device 110 that the user indicates as the device that he expected to be selected may be labeled as the selected device.

In some cases, the user may push a button on the device 110 to provide a user input (push-to-talk button), which causes the device 110 to open its microphone to capture audio data corresponding to the user input. There may be other devices 110 located within earshot of the user that may also capture audio data corresponding to the user input. The training data may include feature vectors corresponding to the audio data captured by the push-to-talk device 110 and the other devices 110 during this interaction, and the feature vector corresponding to the push-to-talk device 110 may be labeled as the selected device (since the user explicitly chose that device).

The training data used to configure the trained component 310 may correspond to multiple different users, multiple different devices/device types, and multiple different device layouts within a physical area.

The device arbitration component 285 of the present disclosure is user-agnostic, that is the trained component 310 may be used to perform device arbitration for multiple different users. The device arbitration component 285 of the present disclosure is device type-agnostic, that is the trained component 310 may be used to perform device arbitration for multiple different types of devices and between different types of devices.

The device arbitration component 285 of the present disclosure does not depend on information related to a device layout or location of multiples devices within a physical area. As such, the device arbitration component 285 does not need to determine a device layout for the household prior to performing device arbitration. The device arbitration component 285 of the present disclosure also does not require information related to the devices, such as microphone gain for each device or other device characteristics. The device arbitration component 285 evaluates certain audio characteristics, including audio data, spectral data and centroid data, to perform device arbitration.

FIG. 5 illustrates an example feature vector that may be provided by the orchestrator 230 to the device arbitration component 285 in some embodiments. In some embodiments, the orchestrator 230 or another component may process the audio signal 211 captured by the device 110 to determine certain features/characteristics corresponding to the audio signal. These features may be provided by the orchestrator 230 to the ASR component 250 to perform automatic speech recognition as described above. In some embodiments, certain features, including the raw audio data, the spectral data and the centroid data, corresponding to the audio signal 211 may be provided to the device arbitration component 285, at substantially the same time as features are provided to the ASR component 250. In some embodiments, the device arbitration component 285 may perform device arbitration at the same time as the ASR component 250 is processing audio data. In other embodiments, the device arbitration component 285 may perform device arbitration at the same time as the wakeword detection component 220 is processing the audio data as described above.

As illustrated in FIG. 5, the feature vector 402 may include audio energy values 502, centroid data 504, and spectral data 506. The audio energy values 502 may be represented by 125 values in the feature vector 402. The centroid data 504 may be represented by 125 values in the feature vector 402. The spectral data 506 may be represented by 32 values in the feature vector 402. In some embodiments, the values corresponding to the audio data, the centroid data and the spectral data may be concatenated as illustrated in FIG. 5 to form the feature vector 402. In other embodiments, the values corresponding to the audio data, the centroid data and the spectral data may be included in the feature vector 402 in a manner in addition to or instead of concatenation. Although FIG. 5 shows a certain order of the features, such as, audio data 502 first, centroid data 504 next and the spectral data 506 at the end, it should be understood that the audio data 502, the centroid data 504 and the spectral data 506 may be presented in a different order within the feature vector 402.

FIG. 6A shows a graph illustrating example frame level energy values that may be included in a feature vector 402. The x-axis represents the frame number and the y-axis represents the energy value. The graph shows a curve 602 that may correspond to the energy values included in a feature vector 402*a* corresponding to audio data 211*a* captured by a device 110*a*. The graph shows a curve 604 that may correspond to the energy values included in a feature vector 402*b* corresponding to audio data 211*b* captured by a device 110*b*. As shown, based on the energy values corresponding to the device 110*a* (the curve 602) in comparison to the energy values corresponding to the device 110*b* (the curve 604) the device 110*a* wins the device arbitration based on operations described herein.

Figure 6B:
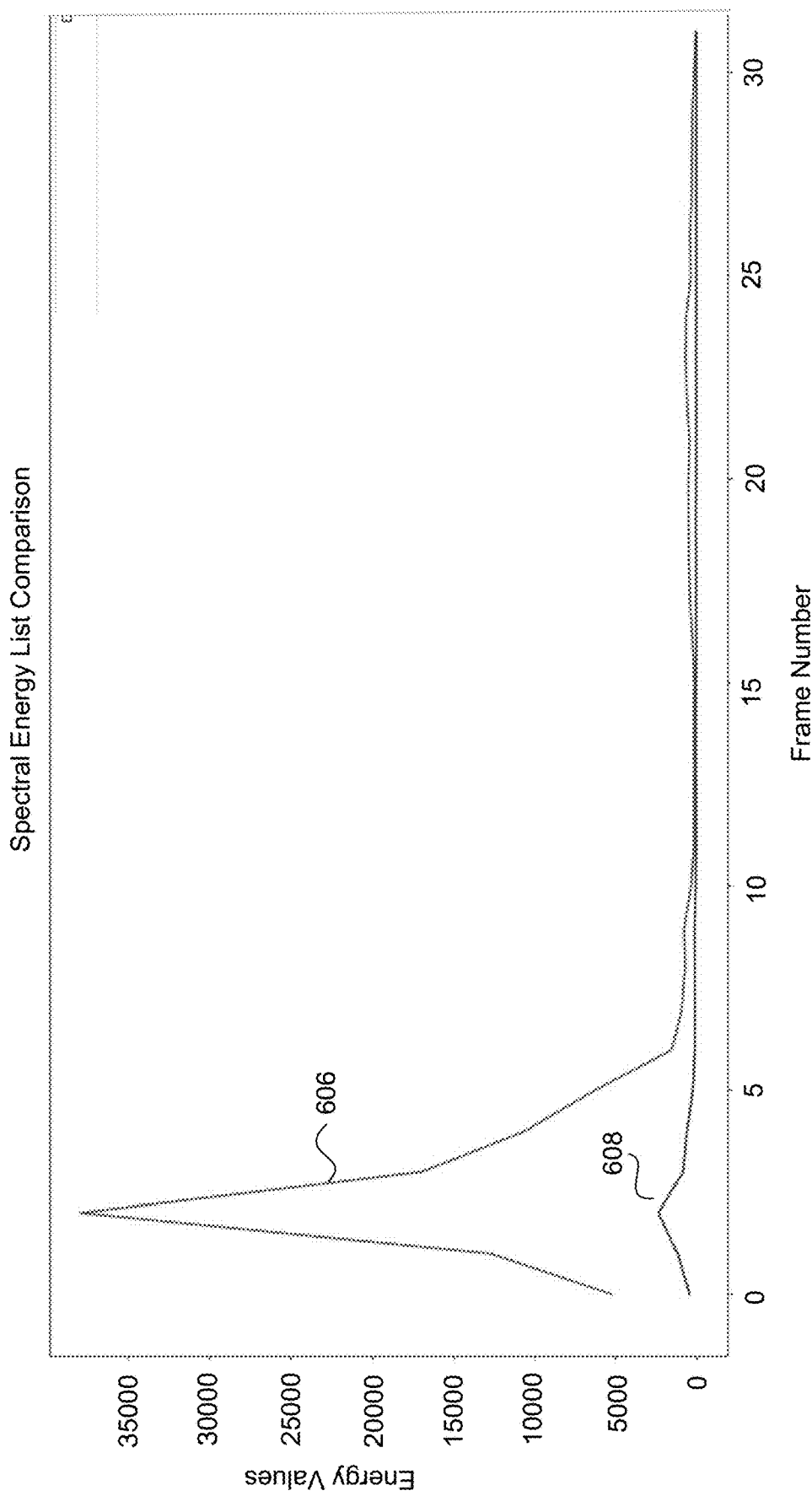

FIG. 6B is a graph illustrating example spectral data that may be included in a feature vector 402. The x-axis represents the frame number and the y-axis represents the spectral energy values. The graph shows a curve 606 that may correspond to the spectral energy values included in a feature vector 402*a* corresponding to audio data 211*a* captured by a device 110*a*. The graph shows a curve 608 that may correspond to the spectral energy values included in a feature vector 402*b* corresponding to audio data 211*b* captured by a device 110*b*. As shown, based on the spectral energy values corresponding to the device 110*a* (the curve 606) in comparison to the spectral energy values corresponding to the device 110*b* (the curve 608) the device 110*a* wins the device arbitration based on operations described herein.

FIG. 6C is a graph illustrating example centroid data that may be included in a feature vector 402. The x-axis represents the frame number and the y-axis represents the centroid energy values. The graph shows a curve 610 that may correspond to the centroid energy values included in a feature vector 402*a* corresponding to audio data 211*a* captured by a device 110*a*. The graph shows a curve 612 that may correspond to the centroid energy values included in a feature vector 402*b* corresponding to audio data 211*b* captured by a device 110*b*. As shown, based on the centroid energy values corresponding to the device 110*a* (the curve 610) in comparison to the spectral energy values corresponding to the device 110*b* (the curve 612) the device 110*a* wins the device arbitration based on operations described herein.

Figure 7:
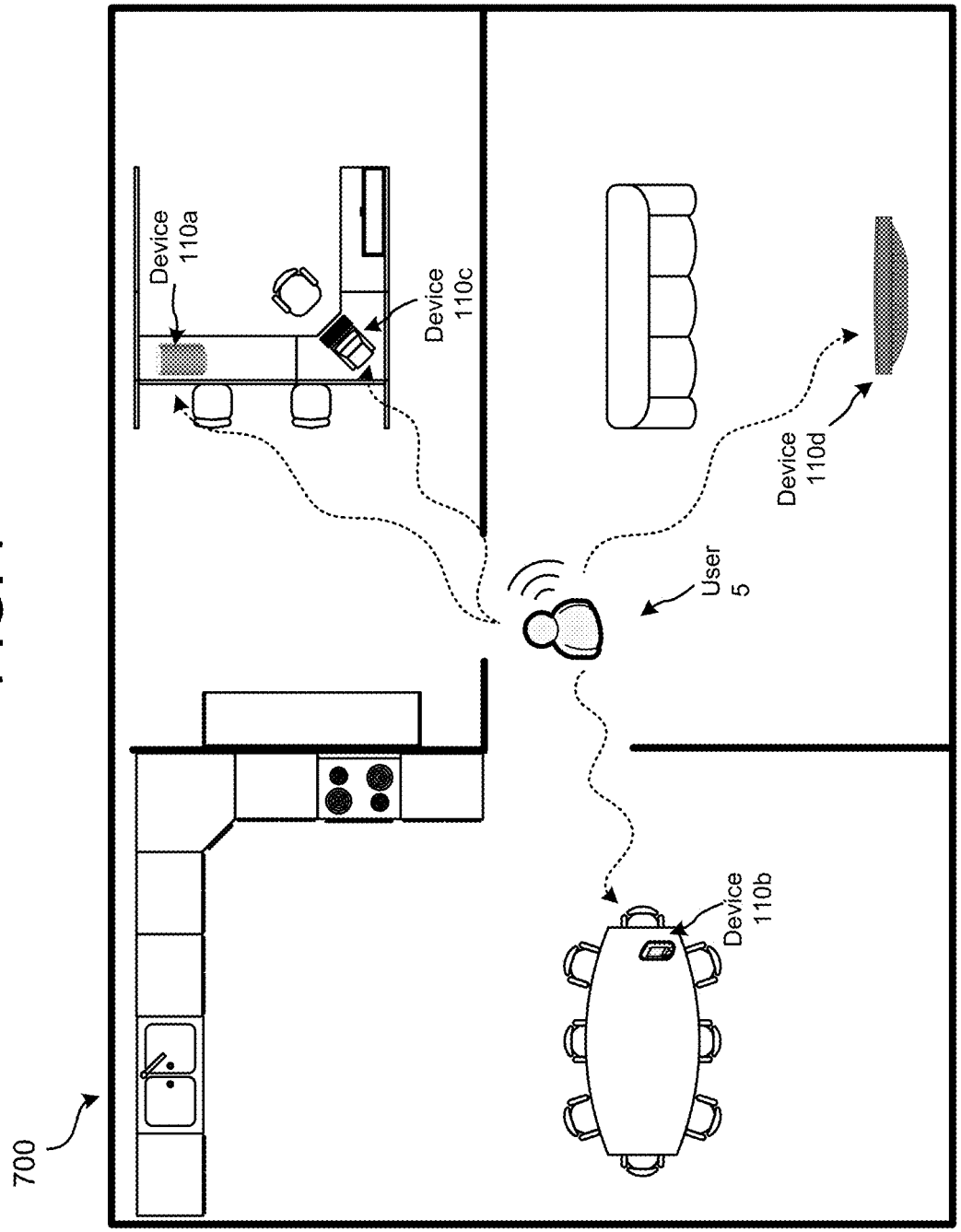
FIG. 7 is a conceptual diagram illustrating a household having multiple devices.

FIG. 7 is a conceptual diagram illustrating a household 700 having multiple devices 110*a*-110*d*. As illustrated, an utterance spoken by the user 5 may be captured by multiple devices 110 within the household. The audio signals captured by the multiple devices 110 are processed by the system(s) 120 as described above to select a device 110 to capture further audio input from the user 5 and/or to present an output to the user 5 responsive to the input. In the illustrated example, the device 110*d* may be selected.

Figure 8:
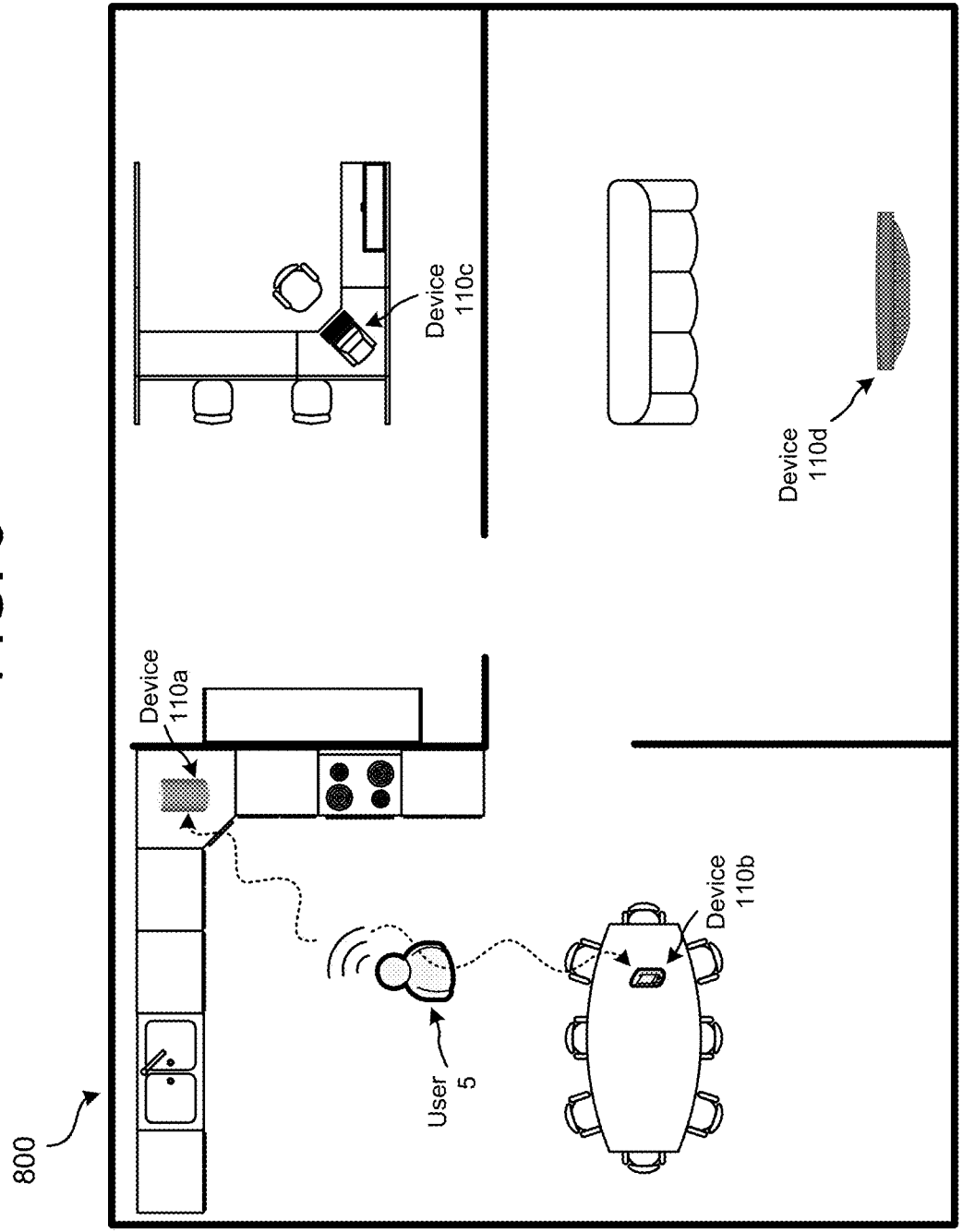
FIG. 8 is a conceptual diagram illustrating another household having multiple devices.

FIG. 8 is a conceptual diagram illustrating another household 800. As illustrated, an utterance spoken by the user 5 may be captured by the device 110*a* and the device 110*b*. As illustrated, the user 5 may be facing the device 110*a* and may direct the utterance to towards the device 110*a*. The audio signals captured by the devices 110*a* and 110*b* are processed by the system(s) 120 as described above to select a device 110 to capture further audio input from the user 5 and/or to present an output to the user 5 responsive to the input. In the illustrated example, the device 110*a* may be selected based on the user 5 directing the utterance towards the device 110*a*.

Figure 9:
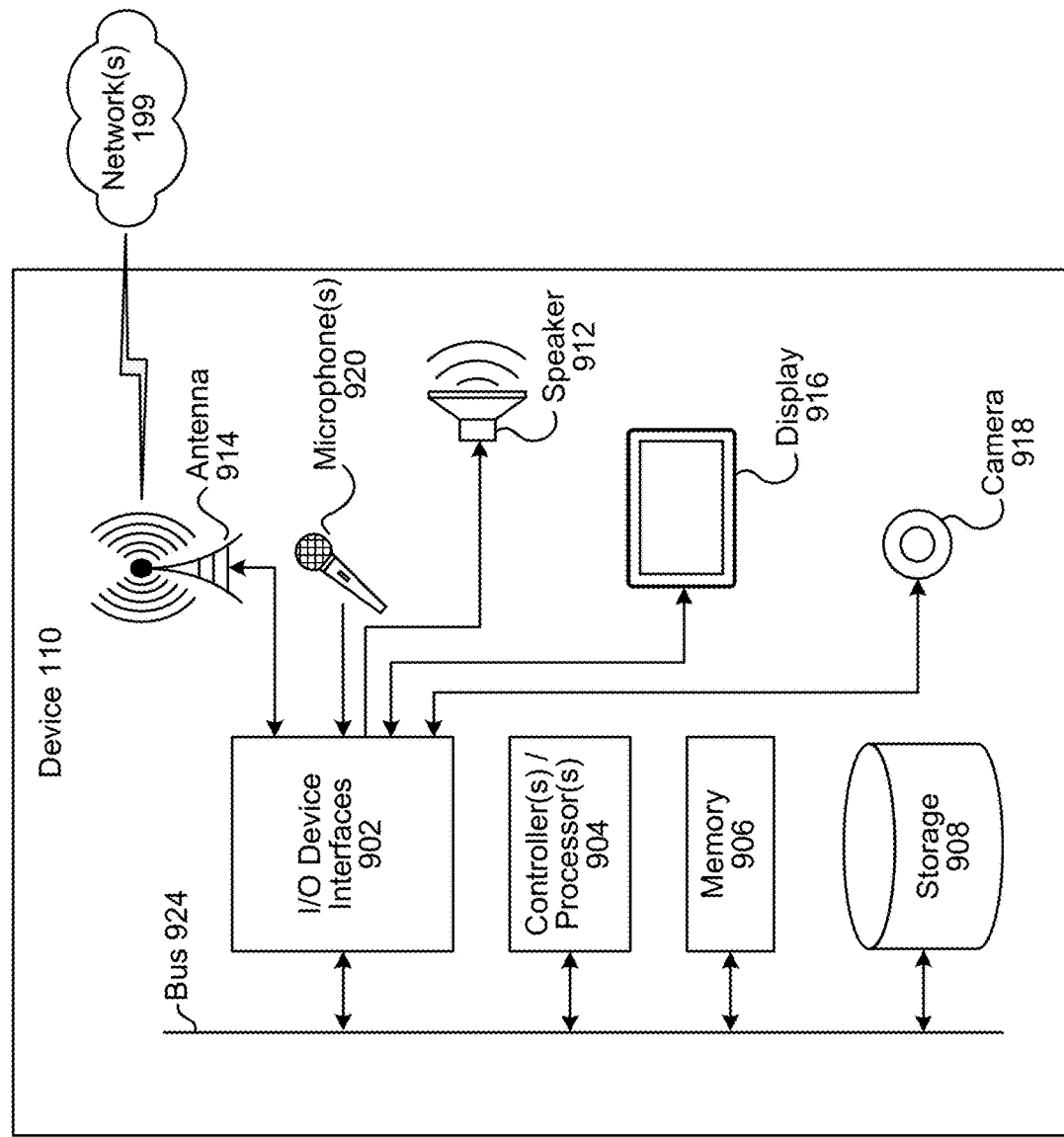
FIG. 9 is a block diagram conceptually illustrating example components of a device according to embodiments of the present disclosure.
Figure 10:
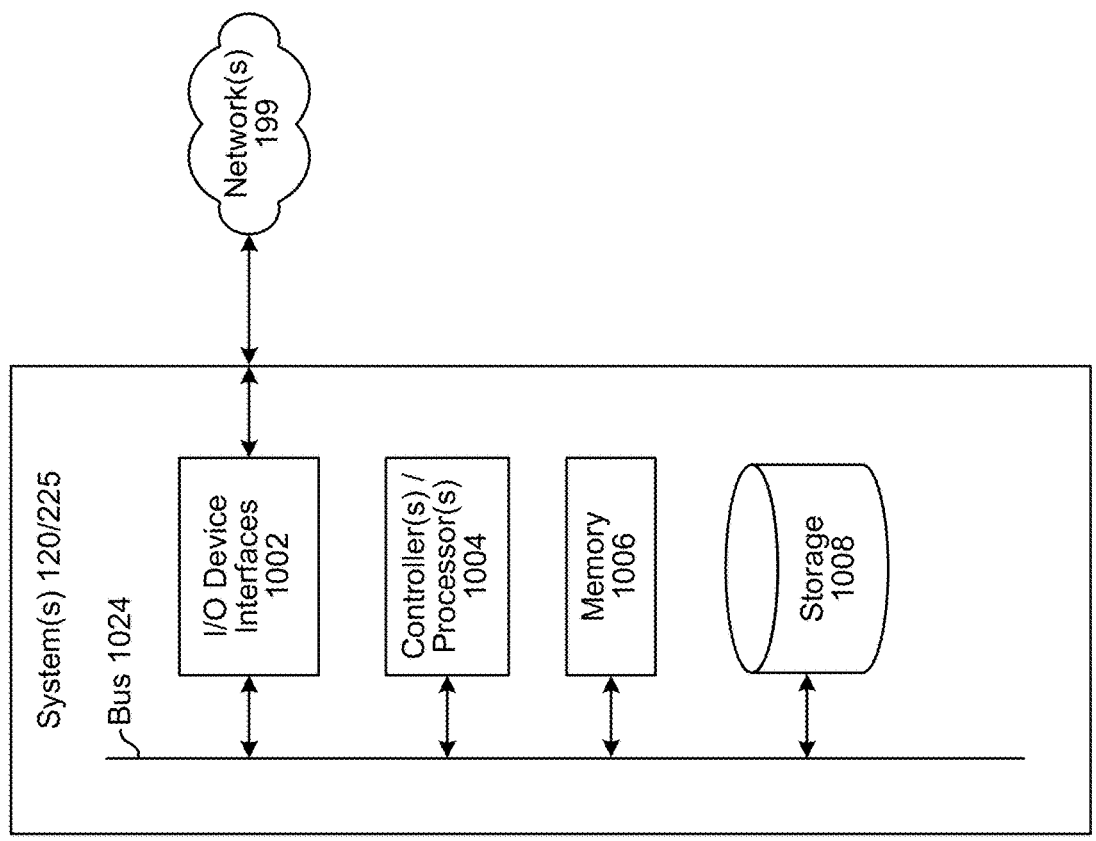
FIG. 10 is a block diagram conceptually illustrating example components of a server according to embodiments of the present disclosure.

FIG. 9 is a block diagram conceptually illustrating a device 110 that may be used with the system. FIG. 10 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/225) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (902/1002).

Computer instructions for operating each device (110/120/225) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/225) includes input/output device interfaces (902/1002). A variety of components may be connected through the input/output device interfaces (902/1002), as will be discussed further below. Additionally, each device (110/120/225) may include an address/data bus (924/1024) for conveying data among components of the respective device. Each component within a device (110/120/225) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (902/1002), processor(s) (904/1004), memory (906/1006), and/or storage (908/1008) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 11:
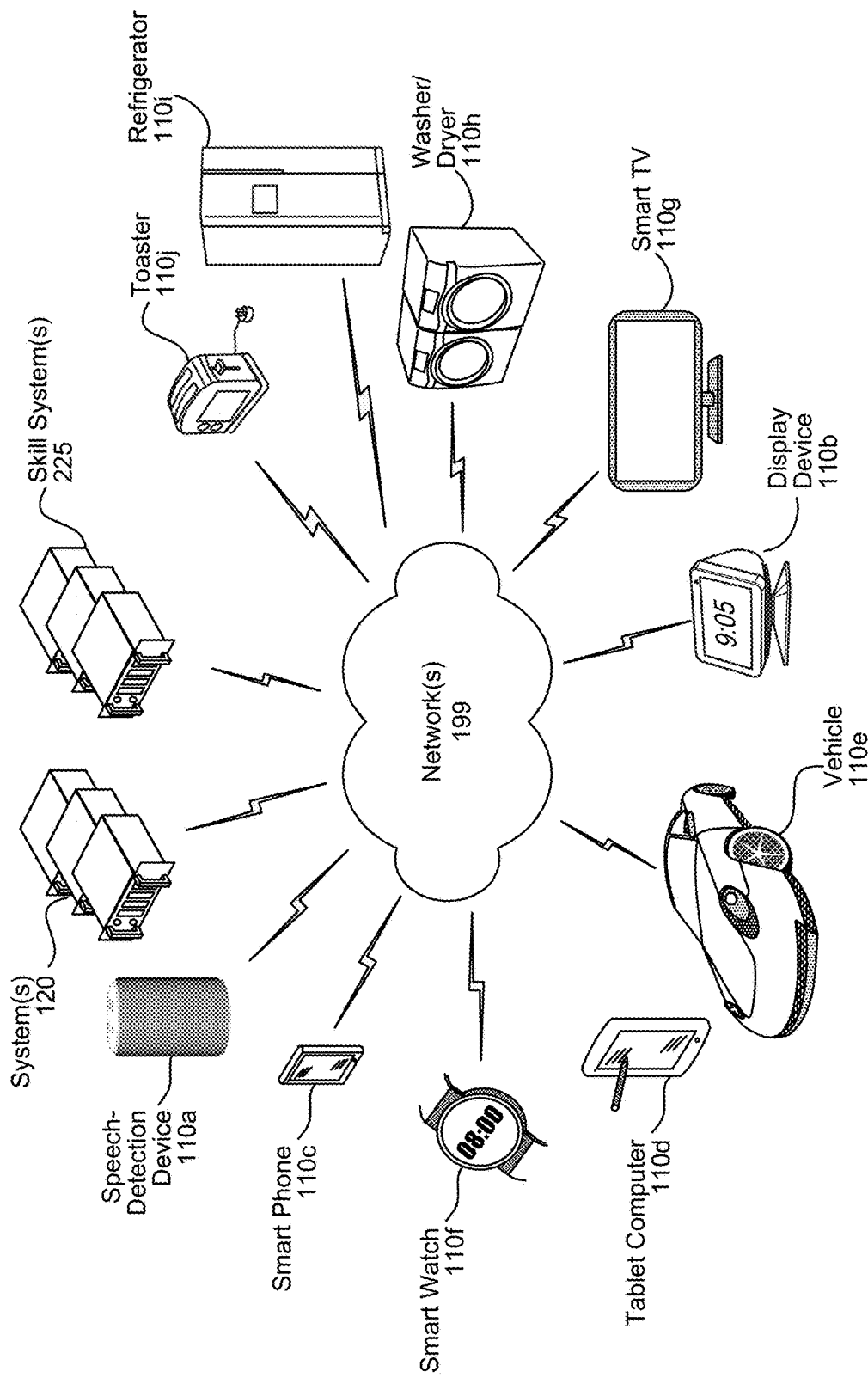
FIG. 11 illustrates an example of a computer network for use with the speech processing system.

As illustrated in FIG. 11, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110c, a smart watch 110f, a tablet computer 110d, a vehicle 110e, a display device 110b, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, from a first device, first audio data corresponding to an utterance;
receiving, from a second device, second audio data corresponding to the utterance;
determining a first portion of the first audio data that corresponds to a wakeword;
determining first spectral data corresponding to the first portion, the first spectral data representing first frequency spectrum energy values corresponding to the first portion;
determining first centroid data corresponding to the first portion, the first centroid data representing a first set of weighted means of first energy values corresponding to the first portion;
determining a second portion of the second audio data that corresponds to the wakeword;
determining second spectral data corresponding to the second portion, the second spectral data representing second frequency spectrum energy values corresponding to the second portion;
determining second centroid data corresponding to the second portion, the second centroid data representing a second set of weighted means of second energy values corresponding to the second portion;
processing the first energy values, the first spectral data and the first centroid data using an encoder to determine a first feature vector;
processing the second energy values, the second spectral data and the second centroid data using the encoder to determine a second feature vector;
processing the first feature vector and the second feature vector using a trained model to determine a score;
determining that the score satisfies a condition indicating that the first device is to be selected for further processing; and
selecting the first device.

2. The computer-implemented method of claim 1, further comprising:
processing the first feature vector to determine first model output data corresponding to the first audio data,
processing the second feature vector using the trained model and the first model output data to determine second model output data, and
processing the first feature vector using the trained model, the second model output data to determine the first score.

3. The computer-implemented method of claim 1, wherein determining the first centroid data comprises:
identifying a first frame window representing 25 ms of the first portion;
identifying the first energy values corresponding to the first frame window;
performing Fast Fourier Transform (FFT) on the first energy values to determine a first set of frequencies;
determining a first weighted mean corresponding to the first frame window using the first set of frequencies and audio signal strength of the first set of frequencies;
identifying a second frame window representing additional 25 ms of the first portion;
identifying the third energy values corresponding to the second frame window;
performing FFT on the third energy values to determine a second set of frequencies; and
determining a second weighted mean corresponding to the second frame window using the second set of frequencies and audio signal strength of the second set of frequencies,
wherein the first set of weighted means includes the first weighted mean and the second weighted mean.

4. A computer-implemented method comprising:
- receiving, from a first device, first audio data;
- receiving, from a second device, second audio data;
- determining a first feature vector representing: first energy values corresponding to the first audio data, first spectral data representing first frequency spectrum energy values corresponding to the first audio data, and first centroid data representing a first set of weighted means of the first energy values;
- determining a second feature vector representing: second energy values corresponding to the second audio data, second spectral data representing second frequency spectrum energy values corresponding to the second audio data, and second centroid data representing a second set of weighted means of the second energy values; and
- processing the first feature vector and the second feature vector to determine selection data; and
- based at least in part on the selection data, selecting the first device to receive additional audio data.

5. The computer-implemented method of claim 4, further comprising:
- processing the first audio data using a Fast Fourier Transformation (FFT) to determine the first spectral data; and
- processing the second audio data using the FFT to determine the second spectral data.

6. The computer-implemented method of claim 4, wherein selecting the first device comprises:
- processing the first feature vector and the second feature vector using a trained model to determine a score; and
- determining that the score satisfies a condition indicating that the first device is to be selected for further processing,
- wherein the selection data includes score.

7. The computer-implemented method of claim 4, further comprising:
- identifying a first frame window representing 25 ms of the first audio data;
- identifying the first energy values corresponding to the first frame window;
- performing Fast Fourier Transform (FFT) on the first energy values to determine a first set of frequencies;
- determining a first weighted mean corresponding to the first frame window using the first set of frequencies and audio signal strength of the first set of frequencies; and
- determining the centroid data to include at least the first weighted mean.

8. The computer-implemented method of claim 4, further comprising:
- receiving the first audio data comprises receiving the first audio data corresponding to a first portion of an utterance representing a wakeword;
- receiving the second audio data comprises receiving the second audio data corresponding the first portion; and
- wherein selecting the first device comprises selecting the first device to receive the additional audio data corresponding to a second portion of the utterance representing a user command.

9. The computer-implemented method of claim 4, further comprising:
- receiving, from a third device, third audio data;
- determining a third feature vector representing: third energy values corresponding to the third audio data, third spectral data representing third frequency spectrum energy values corresponding to the third audio data, and third centroid data representing a first set of weighted means of the third energy values; and
- selecting the first device based at least in part on processing the first feature vector with respect to the second feature vector and the third feature vector.

10. The computer-implemented method of claim 4, further comprising prior to selecting the first device:
- processing at least the first audio data using automatic speech recognition (ASR);
- determining that the first audio data corresponds to speech representing a wakeword;
- determining output data responsive to a user request represented in the first audio data; and
- after selecting the first device, sending the output data to the first device.

11. The computer-implemented method of claim 4, further comprising:
- sending, to the first device, output data requesting a feedback with respect to selection of the first device to respond to a user command;
- receiving, from the first device, input data representing the feedback;
- determining a trained model based at least in part on the input data, selection of the first device, the first feature vector and the second feature vector.

12. A system comprising:
- at least one processor; and
- at least one memory including instructions that, when executed by the at least one processor, cause the system to:
  - receive, from a first device, first audio data;
  - receive, from a second device, second audio data;
  - determine a first feature vector representing: first energy values corresponding to the first audio data, first spectral data representing first frequency spectrum energy values corresponding to the first audio data, and first centroid data representing a first set of weighted means of the first energy values;
  - determine a second feature vector representing: second energy values corresponding to the second audio data, second spectral data representing second frequency spectrum energy values corresponding to the second audio data and second centroid data representing a second set of weighted means of the second energy values; and
  - process the first feature vector and the second feature vector to determine selection data; and
  - based at least in part on the selection data, select the first device to receive additional audio data.

13. The system of claim 12, wherein the instructions that, when executed by the at least one processor, further cause the system to:
- process the first audio data using a Fast Fourier Transformation (FFT) to determine the first spectral data; and
- process the second audio data using the FFT to determine the second spectral data.

14. The system of claim 12, wherein the instructions that, when executed by the at least one processor, further cause the system to:
- process the first feature vector and the second feature vector using a trained model to determine a score; and
- determine that the score satisfies a condition indicating that the first device is to be selected for further processing,
- wherein the selection data includes the score.

15. The system of claim 12, wherein the instructions that, when executed by the at least one processor, further causes the system to:

identify a first frame window representing 25 ms of the first audio data;

identify the first energy values corresponding to the first frame window;

perform Fast Fourier Transform (FFT) on the first energy values to determine a first set of frequencies;

determine a first weighted mean corresponding to the first frame window using the first set of frequencies and audio signal strength of the first set of frequencies; and determine the centroid data to include at least the first weighted mean.

16. The system of claim 12, wherein the instructions that, when executed by the at least one processor, further causes the system to:

receive the first audio data comprises receiving the first audio data corresponding to a first portion of an utterance representing a wakeword;

receive the second audio data comprises receiving the second audio data corresponding the first portion; and select the first device comprises selecting the first device to receive the additional audio data corresponding to a second portion of the utterance representing a user command.

17. The system of claim 12, wherein the instructions that, when executed by the at least one processor, further cause the system to:

receive, from a third device, third audio data;

determine a third feature vector representing: third energy values corresponding to the third audio data, third spectral data representing third frequency spectrum energy values corresponding to the third audio data, and third centroid data representing a third set of weighted means of the third energy values; and select the first device based at least in part on processing the first feature vector with respect to the second feature vector and the third feature vector.

18. The system of claim 12, wherein the instructions that, when executed by the at least one processor, further cause the system to:

process at least the first audio data using automatic speech recognition (ASR);

determine that the first audio data corresponds to speech representing a wakeword;

determine output data responsive to a user request represented in the first audio data; and after selection of the first device, send the output data to the first device.

19. The system of claim 12, wherein the instructions that, when executed by the at least one processor, further cause the system to:

send, to the first device, output data requesting a feedback with respect to selection of the first device to respond to a user command;

receive, from the first device, input data representing the feedback;

determine a trained model based at least in part on the input data, selection of the first device, the first feature vector and the second feature vector.

* * * * *